(12) United States Patent
Nakamura et al.

(10) Patent No.: US 10,247,077 B2
(45) Date of Patent: Apr. 2, 2019

(54) RETENTION MATERIAL FOR GAS PROCESSING DEVICE

(71) Applicant: NICHIAS CORPORATION, Tokyo (JP)

(72) Inventors: Hiroki Nakamura, Tokyo (JP); Nobuya Tomosue, Tokyo (JP); Tadashi Sakane, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 195 days.

(21) Appl. No.: 14/777,983

(22) PCT Filed: Mar. 24, 2014

(86) PCT No.: PCT/JP2014/001672
§ 371 (c)(1),
(2) Date: Sep. 17, 2015

(87) PCT Pub. No.: WO2014/156104
PCT Pub. Date: Oct. 2, 2014

(65) Prior Publication Data
US 2016/0115846 A1 Apr. 28, 2016

(30) Foreign Application Priority Data

Mar. 27, 2013 (JP) .................................. 2013-066240
Dec. 10, 2013 (JP) .................................. 2013-255067

(51) Int. Cl.
*F01N 3/28* (2006.01)
*F01N 3/021* (2006.01)
*F01N 13/16* (2010.01)

(52) U.S. Cl.
CPC .......... *F01N 3/2853* (2013.01); *F01N 3/0211* (2013.01); *F01N 13/16* (2013.01);
(Continued)

(58) Field of Classification Search
CPC ...... F01N 3/2011; F01N 3/2853; F01N 13/16; F01N 2350/04; F01N 2350/02; F01N 2350/00
(Continued)

(56) References Cited

U.S. PATENT DOCUMENTS

| 4,906,518 A | 3/1990 | Inabata |
| 2003/0185723 A1 | 10/2003 | Anji et al. |

(Continued)

FOREIGN PATENT DOCUMENTS

| EP | 2 896 727 A1 | 7/2015 |
| EP | 2 914 767 | 9/2015 |

(Continued)

OTHER PUBLICATIONS

Extended European Search Report issued in corresponding application 14774652.3, completed Oct. 21, 2016 and dated Nov. 2, 2016.
(Continued)

*Primary Examiner* — Tom P Duong
(74) *Attorney, Agent, or Firm* — Griffin and Szipl PC

(57) ABSTRACT

A retention material for a gas processing device including a processing structure and a casing for accommodating the processing structure, the retention material including inorganic fibers and being arranged between the processing structure and the casing, wherein in a test of repeating a cycle of compressing the retention material until a bulk density of the retention material becomes a prescribed compression bulk density, followed by retaining for 10 seconds, and then releasing until a bulk density of the retention material becomes a release bulk density that is smaller by 12% of said prescribed compression bulk density; a release surface pressure of the retention material after repeating the cycle 2500 times and the compression bulk
(Continued)

density of the retention material satisfies the relationship, $P \geq 17.10 \times D - 1.62$ wherein P is the release surface pressure ($N/cm^2$) and D is the compression bulk density ($g/cm^3$).

7 Claims, 3 Drawing Sheets

(52) U.S. Cl.
CPC ...... *F01N 2310/00* (2013.01); *F01N 2350/00* (2013.01); *F01N 2350/02* (2013.01); *F01N 2350/04* (2013.01); *Y02T 10/20* (2013.01)

(58) Field of Classification Search
USPC .................. 422/177, 179; 428/221; 442/348
See application file for complete search history.

(56) References Cited

U.S. PATENT DOCUMENTS

| | | |
|---|---|---|
| 2003/0185725 A1 | 10/2003 | Mutou |
| 2009/0060802 A1* | 3/2009 | Beauharnois ...... B01D 46/2422 422/177 |
| 2009/0257925 A1 | 10/2009 | Sugino |
| 2012/0149271 A1 | 6/2012 | Sugino |
| 2015/0210598 A1 | 7/2015 | Tomosue |
| 2015/0251163 A1 | 9/2015 | Ohshima |

FOREIGN PATENT DOCUMENTS

| | | |
|---|---|---|
| JP | 2003-20938 A | 1/2003 |
| JP | 2003-293754 A | 10/2003 |
| JP | 2007-218221 A | 8/2007 |
| JP | 2009-257422 A | 11/2009 |
| JP | 2011-026755 A | 2/2011 |
| JP | 2012-157809 A | 8/2012 |
| WO | 03/000414 A1 | 1/2003 |
| WO | 2010/122337 A1 | 10/2010 |
| WO | 2012/106298 A1 | 8/2012 |
| WO | 2014/068528 A1 | 5/2014 |

OTHER PUBLICATIONS

Third party submission filed Jun. 9, 2017 in corresponding Japanese application 2013-255067 (no translation available; submitted for certification).

"Polycrystalline Alumina fiber for high temperature refractory use . . . ," MAFTEC brochure, Mitsubishi Chemical Functional Products, Inc., 8 pages, 2006.

Office Action issued in corresponding Japanese application 2013-255067 dated Jun. 20, 2017, with machine translation.

English translation of the Written Opinion of the International Searching Authority issued in corresponding application PCT/JP2014/001672 dated Sep. 29, 2015.

International Search Report issued in corresponding application PCT/JP2014/001672, completed Jun. 4, 2014 and dated Jun. 17, 2014.

Office Action issued in corresponding European Application 14 774 652.3, dated Oct. 24, 2017.

Temtek Solutions: "MAFTEC Blanket, Bulk and Board Products", Apr. 30, 2012 (Apr. 30, 2012), pp. 1-3, XP055415045, http://www.temteksolutions.com Retrieved from the Internet: URL:http://www.temteksolutions.com/user/products/5285-pdfs-1- file.pdf [retrieved on Oct. 12, 2017].

Office Action issued in corresponding Japanese application 2013-255067 dated Nov. 6, 2018 (no translation available; submitted for certification).

* cited by examiner

RETENTION MATERIAL FOR GAS PROCESSING DEVICE

This is a National Phase Application in the United States of International Patent Application No. PCT/JP2014/001672 filed Mar. 24, 2014, which claims priority on Japanese Patent Application Nos. 2013-066240, filed Mar. 27, 2013 and 2013-255067, filed Dec. 10, 2013. The entire disclosures of the above patent applications are hereby incorporated by reference.

TECHNICAL FIELD

The invention relates to a retention material for a gas processing device, a gas processing device and a method for producing the same. In particular, the invention relates to keeping the retention power of a retention material.

BACKGROUND ART

In a vehicle such as an automobile or the like, a catalyst converter for removing toxic substances such as carbon monoxide, hydrocarbon and nitrogen oxide contained in an exhaust gas is provided. As a conventional catalyst converter, one comprising a catalyst support, a metal casing for accommodating the catalyst support and a mat-like inorganic fiber-made retention material disposed between the catalyst support and the casing is known (Patent Document 1, for example).

RELATED ART DOCUMENT

Patent Document

Patent Document 1: JP-A-2007-218221

SUMMARY OF INVENTION

However, in use of a catalyst converter which is repeatedly heated and cooled, conventionally, there is a problem that retention power of a retention material is lowered with the lapse of time.

The invention has been attained based on the above-mentioned problem, and one object thereof is to provide a retention material for a gas processing device of which the retention power can be effectively kept, a gas processing device and a method for producing the same.

The retention material for a gas processing device and the like according to an embodiment of the invention that are provided in order to solve the above-mentioned problem are as follows:

1. A retention material for a gas processing device comprising a processing structure and a casing for accommodating the processing structure,
    the retention material comprising inorganic fibers and being arranged between the processing structure and the casing,
    wherein
    in a test of repeating a cycle of compressing the retention material until a bulk density of the retention material becomes a prescribed compression bulk density, followed by retaining for 10 seconds, and then releasing until a bulk density of the retention material becomes a release bulk density that is smaller by 12% of said prescribed compression bulk density; a release surface pressure of the retention material after repeating the cycle 2500 times and the compression bulk density of the retention material satisfies the following relationship:

$P \geq 17.10 \times D - 1.62$ wherein P is the release surface pressure (N/cm²) and D is the compression bulk density (g/cm³).
2. The retention material for a gas processing device according to 1, wherein the inorganic fibers are alumina fibers comprising 70 wt % to 75 wt % of alumina and 30 wt % to 25 wt % of silica.
3. The retention material for a gas processing device according to 1 or 2, wherein a true density of the inorganic fibers is 3.02 g/cm³ to 3.50 g/cm³.
4. The retention material for a gas processing device according to any one of 1 to 3, wherein a ratio of the true density of the inorganic fibers to a theoretical value of the true density is 86.9% or more.
5. The retention material for a gas processing device according to any one of 1 to 4, wherein the retention material is a retention material produced by a wet method or by a dry method.
6. The retention material for a gas processing device according to any one of 1 to 5, wherein a wet volume of the retention material is 750 mL/5 g or more.
7. A gas processing device, comprising:
    a processing structure;
    a casing for accommodating the processing structure; and
    the retention material according to any one of 1 to 6 that is arranged between the processing structure and the casing.
8. A method for producing a gas processing device comprising:
    a processing structure;
    a casing for accommodating the processing structure; and
    the retention material according to any one of 1 to 6 that is arranged between the processing structure and the casing,
    the method comprising arranging the retention material according to any one of 1 to 6 between the processing structure and the casing.

According to the invention, it is possible to provide a retention material for a gas processing device of which the retention power can be effectively retained, a gas processing device and a method for producing the same.

MODE FOR CARRYING OUT THE INVENTION

Hereinbelow, one embodiment of the invention will be explained. The invention is not limited to this embodiment.

Figure 1:
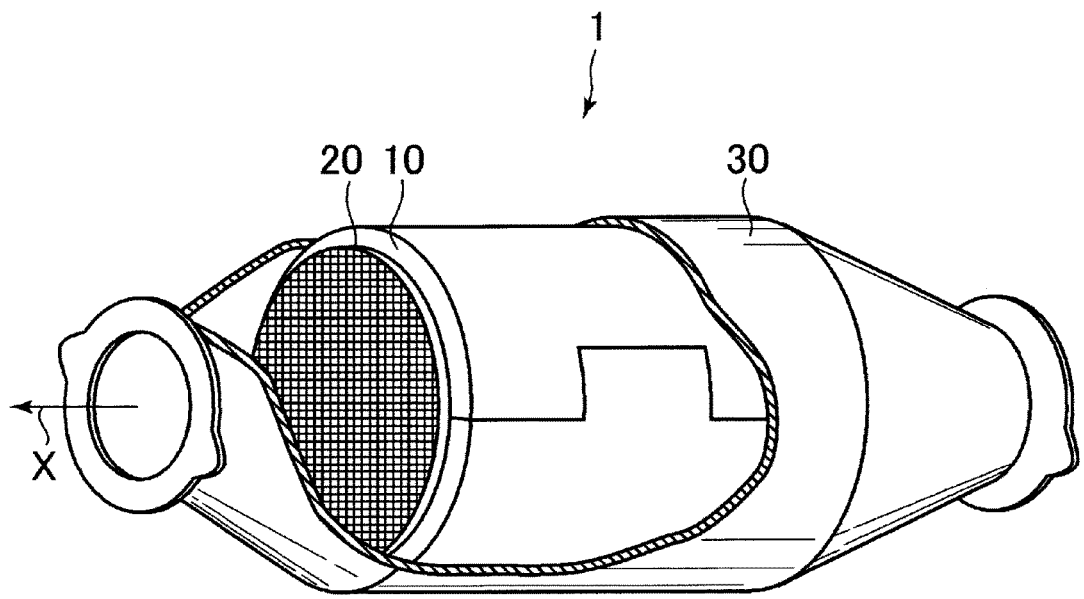
FIG. 1 is an explanatory view showing one example of a gas processing device according to one embodiment of the invention.

FIG. 1 is an explanatory view showing one example of the gas processing device 1 according to this embodiment. As shown in FIG. 1, the gas processing device 1 is provided with a processing structure 20, a casing 30 for accommodating the processing structure 20 and a retention material 10 disposed between the processing structure 20 and the casing 30. In FIG. 1, for the convenience of explanation, part of the casing 30 is omitted, whereby the processing structure 20 and the retention material 10 accommodated within the casing 30 are shown in an exposed state.

Figure 2:
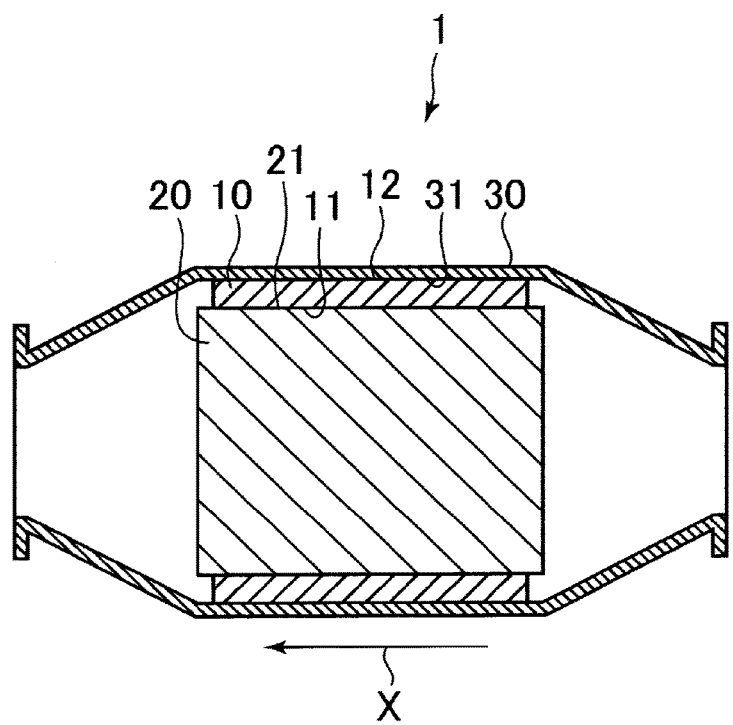
FIG. 2 is an explanatory view showing one example of a cross section obtained by cutting the gas processing device according to one embodiment of the invention in a gas flowing direction.

FIG. 2 is an explanatory view showing one example of a cross section obtained by cutting the gas processing device 1 in a direction indicated by the arrow X. The direction indicated by this arrow X in the direction in which the gas to be processed flows within the processing structure 20 of the gas processing device 1.

The gas processing device 1 is used for processing a gas, such as purification of a gas. That is, the gas processing device 1 is used for removing toxic substances and/or particles contained in the gas.

Specifically, the gas processing device 1 is an exhaust gas processing device for purifying an exhaust gas, for example. In this case, the gas processing device 1 is provided in a vehicle such as an automobile to remove toxic substances and/or particles contained in an exhaust gas discharged from an internal combustion engine (gasoline engine, diesel engine, etc.).

That is, the gas processing device 1 is a catalyst converter used in order to remove toxic substances contained in an exhaust gas of gasoline engine, for example. Further, the gas processing device 1 is DPF (Diesel Particulate Filter) used for removing particles contained in an exhaust gas of a diesel engine, for example.

In the method for processing a gas utilizing the gas processing device 1, the gas is processed by allowing a gas to be processed to flow within the processing structure 20 of the gas processing device 1. In the gas processing device 1 shown in FIG. 1 and FIG. 2, in the direction shown by the arrow X, a gas such as an exhaust gas is flown from one end of the casing 30, and the gas is purified while flowing within the processing structure 20. The purified gas is flown out of the gas processing device 1 from the other end of the casing 30.

To one end and the other end of the gas processing device 1 provided in a vehicle such as an automobile or the like, a pipe that introduces a gas such as an exhaust gas from the upstream side to the gas processing device 1 and a pipe that introduces the purified gas from the gas processing device 1 to the downstream side are respectively connected.

The processing structure 20 is a structure having a function of processing a gas. That is, when the gas processing device 1 is a catalyst converter, the processing structure 20 is a catalyst support having a catalyst for purifying a gas and a support that supports the catalyst. The catalyst is one for removing a toxic substance (carbon monoxide, hydrocarbon, nitrogen oxide, etc.) contained in a gas such as an exhaust gas, for example. More specifically, the catalyst is a metal catalyst such as a noble metal catalyst, or the like. The support for supporting a catalyst is a cylindrical body (e.g. a cylindrical honeycomb-like body) made of an inorganic material such as ceramics (cordierite, etc.)

Further, when the gas processing device 1 is a device for removing particles contained in a gas (e.g. DPF), the processing structure 20 is a structure that has a filter for catching the particles in the gas. In this case, the processing structure 20 may further contain a catalyst or may not necessarily contain a catalyst.

The casing 30 is a cylindrical body in which a space capable of accommodating the processing structure 20 is formed in the inside thereof. The casing 30 is made of a metal, for example. A metal constituting the casing 30 is not particularly limited, but is selected from a group consisting of stainless steel, iron and aluminum.

Further, the casing 30 may be divided into plural parts, or may be an integrated one that cannot be divided. In this embodiment, the casing 30 is an integrated cylindrical body that cannot be divided.

The retention material 10 is used to retain the processing structure 20 in the casing 30. That is, by arranging the retention material 10 in a gap between the processing structure 20 and the casing 30 in a compressed state, the retention material 10 retains the processing structure 20 stably within the casing 30.

The retention material 10 is required to have the following functions; i.e. a function of safely retaining the processing structure 20 in the casing 30 such that the processing structure 20 is prevented from being broken by colliding with the casing 30 by vibration or for other reasons in the gas processing device 1, and a function of sealing the gap such that an unpurified gas is prevented from leaking from the gap between the processing structure 20 and the casing 30 to the downstream side. Further, when a high-temperature (e.g. 200 to 900° C.) gas such as an exhaust gas flows within the gas processing device 1, the retention material 10 is required to have both heat resistance and heat insulating property.

For the reason mentioned above, the retention material 10 is a product made of inorganic fibers. That is, the retention material 10 comprises inorganic fibers as a main component. Specifically, the retention material 10 comprises 90 wt % or more of inorganic fibers, for example.

The inorganic fibers constituting the retention material 10 are preferably inorganic fibers that do not deteriorate or hardly deteriorate when used in the gas processing device 1. It is possible to use alumina fibers comprising 70 wt % to 75 wt % alumina and 30 wt % to 25 wt % of silica. Preferable are fibers comprising 72 wt % to 74 wt % of alumina and 28 wt % to 26 wt % of silica. The fibers may be polycrystalline fibers.

As for the inorganic fibers, it is preferred that the inorganic fibers be inorganic fibers that can allow the release surface pressure of the retention material 10 to be 8.5 (N/cm$^2$) or more after repeating 1000 cycles in a test repeating a cycle in which cycle the retention material 10 composed of the inorganic fibers is compressed until the bulk density thereof becomes a bulk density (compression bulk density) of 0.5 (g/cm$^3$), is kept in this state for 10 seconds, and then released until the bulk density becomes a bulk density (release bulk density) of 0.44 (g/cm$^3$) that is smaller by 12% of the compression bulk density. In this case, the retention material 10 may be one that is produced by a wet method mentioned later.

It is preferred that the inorganic fibers that can be used in the retention material of the invention have a high true density. The true density is preferably 3.02 g/cm$^3$ or more or 3.03 g/cm$^3$ or more. Although no particular restrictions are imposed on the upper limit, it may be 3.50 g/cm³ or less, 3.30 g/cm³ or less, 3.10 g/cm³ or less, 3.08 g/cm³ or less, 3.07 g/cm³ or less or 3.06 g/cm³ or less.

The true density is preferably 86.9% or more of a theoretical value thereof, and is preferably 87.0% or more or 87.1% or more. The upper limit thereof is not particularly restricted, but may be 88.2% or less, 88.0% or less or 87.9% or less.

When the true density is close to its theoretical value, it means that the amount of gaps contained in the fibers is small. The void amount can be reduced by changing the conditions of firing. When the inorganic fibers are composed of two or more components, the theoretical value of the true density is obtained from the density of each of the components and the composition ratio of the components. Specifically, when the inorganic fibers are composed of alumina and silica, the true density is obtained by the following formula:

Theoretical value of true density=(density of alumina)×(composition ratio of alumina)+(density of silica)×(composition ratio of silica)

The retention material 10 may contain a binder in addition to the inorganic fibers. The type of the binder is not restricted, and an organic binder and/or an inorganic binder may be used. That is, for example, the retention material 10 may be composed of inorganic fibers and may contain an organic binder.

In the retention material, the total of the inorganic fibers and a binder as an optional component may preferably be 95 wt % or more, 98 wt % or more or 99 wt % or more. Further, the total may be 100 wt %, provided that inevitable impurities may be contained.

The shape of the retention material 10 is not particularly restricted as long as it can allow the processing structure 20 to be retained within the casing 30. That is, the retention material 10 may be a plate-like body (a film, a sheet, a blanket, a mat, or the like) or may be a cylindrical body.

When the retention material 10 is a plate-like body, one end and the other end of the retention material 10 may be formed in a corresponding shape that can be engaged with each other. That is, as shown in FIG. 1, the one end and the other end of the plate-like retention material 10 are respectively formed in corresponding concave- and convex shapes. In the state where the retention material 10 is wound around the outer surface of the processing structure 20, the one end and the other end are engaged.

The method for producing the retention material 10 is not particularly restricted. The retention material 10 may be one that is produced by a wet method or a dry method. In the wet method, for example, in a mold for dehydration molding having a prescribed shape, an aqueous slurry containing inorganic fibers for constituting the retention material 10, an organic binder (for example, rubber, a water-soluble organic high-molecular compound, a thermoplastic resin, a thermosetting resin or the like) is flown. Subsequently, by conducting dehydration molding, a molded product (a wet molded product) that is formed of the inorganic fibers and has a shape corresponding to the shape of the mold is obtained. Thereafter, by compressing the wet molded product such that the properties (e.g. bulk density) thereof be in a desired range, followed by drying, whereby the retention material 10 that is a final molded product formed of the inorganic fibers can be obtained.

The retention material 10 may be obtained by firing the dried molded product mentioned above. In this case, the firing temperature is not particularly restricted, and may be a temperature that allows the organic binder contained in the dried molded product to disappear.

Specifically, the firing temperature may be 300° C. or more, or may be 500° C. or more, for example. The upper limit of the firing temperature is not specifically restricted. The firing temperature may be 900° C. or less, for example.

In the dry method, for example, by subjecting collected inorganic fibers to needling, the retention material 10 as a formed product made of the inorganic fibers is obtained. That is, the retention material 10 produced by the dry method may be the so-called needle mat.

One of the characteristic features of the invention is that when the retention material 10 is tested by repeating a cycle of compression and release in which cycle, the retention material 10 is compressed until the bulk density thereof becomes a prescribed bulk density (compression bulk density) and is kept for 10 seconds, and thereafter, the retention material 10 is released until the bulk density becomes a bulk density that is smaller by 12% than the compression bulk density (a bulk density that is 0.88 times of the compression bulk density) (release bulk density); the release surface pressure and the compression bulk density of the retention material 10 after repeating the cycle 2500 times satisfy the following relationship: $P\ 17.10 \times D - 1.62$ (in this relationship, P is the release surface pressure (N/cm²) and D is the compression bulk density (g/cm³)).

The prescribed compression bulk density can be 0.30 g/cm³, 0.40 g/cm³ and/or 0.50 g/cm³.

Figure 3:
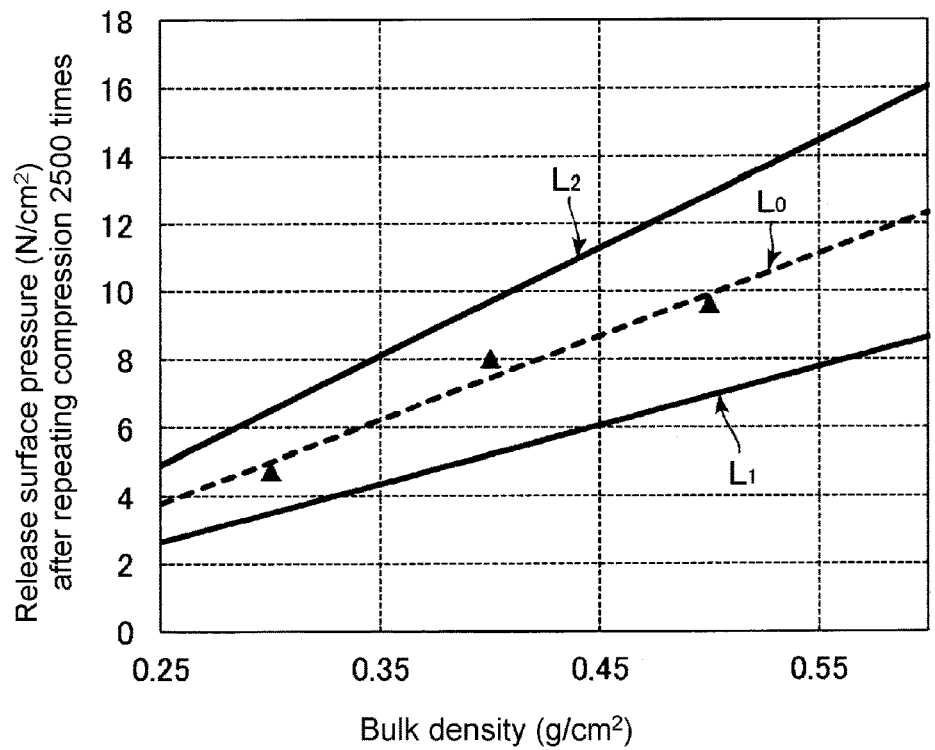
FIG. 3 is an explanatory view showing a release surface pressure after compression repeating test of the retention material according to one embodiment of the invention.

FIG. 3 shows an explanatory view showing the relationship between the compression bulk density and the release surface pressure. In FIG. 3, the horizontal axis indicates the bulk density (g/cm³) of the retention material being compressed and the vertical axis indicates the release surface pressure (N/cm²) after repeating compression 2500 times. The three black solid triangle each indicates the release surface pressure of the retention material 10 after repeating compression 2500 times measured in Example 1 mentioned later.

In FIG. 3, the broken line L0 is a straight line obtained by linearly approximating the three actually measured values indicated by the black solid triangle. When the compression bulk density is indicated as D (g/cm³) and the release surface pressure after repeating compression 2500 times is indicated as P (N/cm²), this broken line L0 is expressed as follows: $P=22.42 \times D - 2.31$. Similarly, in FIG. 3, the solid line L1 is expressed as follows: $P=17.10 \times D - 1.62$.

That is, after the retention material 10 that satisfies the above-mentioned relationship ($P \geq 17.10 \times D - 1.62$) is compressed and released 2500 times, the release surface pressure P (N/cm²) thereof is plotted on the solid line L1 or in a region above the solid line L1 in FIG. 3.

Further, in the above-mentioned compression repeating test, the release surface pressure P (N/cm²) after repeating compression 2500 times and the compression bulk density D (g/cm³) of the retention material 10 may satisfy the following relationship: $P \geq 19.54 \times D - 1.85$. The straight line relating to this relationship ($P=19.54 \times D - 1.85$) is plotted between the broken line L0 and the solid line L1 in FIG. 3.

In the above-mentioned compression repeating test, the release surface pressure P (N/cm²) after repeating compression 2500 times and the compression bulk density D (g/cm³) of the retention material 10 may satisfy the following relationship: $P \geq 21.98 \times D - 2.08$. The straight line relating to this relationship ($P=21.98 \times D - 2.08$) is plotted in FIG. 3 between the broken line L0 and the straight line in the preceding paragraph ($P=19.54 \times D - 1.85$).

In the above-mentioned compression repeating test, the release surface pressure P (N/cm$^2$) after repeating compression 2500 times and the compression bulk density D (g/cm$^3$) of the retention material 10 may satisfy the following two relationships: P≥17.10×D−1.62 and P≤31.75×D−3.00. In FIG. 3, the solid line L2 is expressed as P=31.75×D−3.00. In FIG. 3, the solid line L2 is shown symmetrically with the solid line L1 relative to the broken line L0.

In the above-mentioned compression repeating test, the release surface pressure P (N/cm$^2$) after repeating compression 2500 times and the compression bulk density D (g/cm$^3$) of the retention material 10 may satisfy the following two relationships: P≥19.54×D−1.85 and P≤29.31×D−2.77. In FIG. 3, the solid line relating to the latter relationship (P=29.31×D−2.77) is shown symmetrically with the straight line relating to the former relationship (P≥19.54×D−1.85) relative to the broken line L0.

In the above-mentioned compression repeating test, the release surface pressure P (N/cm$^2$) after repeating compression 2500 times and the compression bulk density D (g/cm$^3$) of the retention material 10 may satisfy the following two relationships: P≥21.98×D−2.08 and P≤26.86×D−2.54. In FIG. 3, the straight line relating to the latter relationship (P=26.86×D−2.54) is shown symmetrically with the straight line relating to the former relationship (P=21.98×D−2.08) relative to the broken line L0.

In the above-mentioned relationship between the release surface pressure P (N/cm$^2$) after repeating compression 2500 times and the compression bulk density D (g/cm$^3$) of the retention material 10, the compression bulk density (D) may be 0.25 g/cm$^3$ or more and 0.55 g/cm$^3$ or less, 0.30 g/cm$^3$ or more and 0.55 g/cm$^3$ or less or 0.30 g/cm$^3$ or more and 0.50 g/cm$^3$ or less, for example.

The surface pressure that the retention material 10 shows when the retention material 10 is compressed until the bulk density thereof becomes a prescribed compression bulk density, that is evaluated as the initial surface pressure in the Examples mentioned later, may be 21 N/cm$^2$ or more when the compression bulk density is 0.30 g/cm$^3$, 33 N/cm$^2$ or more when the compression bulk density is 0.35 g/cm$^3$, 46 N/cm$^2$ or more when the compression bulk density is 0.40 g/cm$^3$, 60 N/cm$^2$ or more when the compression bulk density is 0.45 g/cm$^3$ or 73 N/cm$^2$ or more when the compression bulk density is 0.50 g/cm$^3$, for example.

The initial surface pressure of this retention material 10 may be 22 N/cm$^2$ or more when the compression bulk density is 0.30 g/cm$^3$, 36 N/cm$^2$ or more when the compression bulk density is 0.35 g/cm$^3$, 53 N/cm$^2$ or more when the compression bulk density is 0.40 g/cm$^3$, 70 N/cm$^2$ or more when the compression bulk density is 0.45 g/cm$^3$ or 86 N/cm$^2$ or more when the compression bulk density is 0.50 g/cm$^3$, for example.

In any of the above-mentioned cases, the initial surface pressure of the retention material 10 may be 30 N/cm$^2$ or less when the compression bulk density is 0.30 g/cm$^3$, 50 N/cm$^2$ or less when the compression bulk density is 0.35 g/cm$^3$, 80 N/cm$^2$ or less when the compression bulk density is 0.40 g/cm$^3$, 110 N/cm$^2$ or less when the compression bulk density is 0.45 g/cm$^3$ or 150 N/cm$^2$ or less when the compression bulk density is 0.50 g/cm$^3$.

The wet volume of the retention material 10 is not particularly restricted. For example, it may be 750 mL/5 g or more, 800 mL/5 g or more, 850 mL/5 g or more, 900 mL/5 g or more, or 950 mL/5 g or more, for example.

The wet volume of the retention material 10 may be 1000 mL/5 g or more, preferably be 1050 mL/5 g or more, and more preferably be 1100 mL/5 g or more.

As mentioned above, the retention material 10 according to this embodiment can keep its high retention power after repeated compression. Therefore, the retention material 10 can be effectively light in weight. That is, by reducing the width (the length in the gas processing direction of the gas processing device 1) and/or the basis weight (g/m$^2$) of the retention material 10 as compared with those (that) of conventional products, the weight thereof can be reduced.

Specifically, the ratio of the area of an inner surface 11 of the retention material 10 relative to the area of an outer surface 21 of the processing structure 20 may be 80% or less, 70% or less, or 60% or less.

In these cases, although the lower limit of the ratio of the area of the inner surface 11 of the retention material 10 relative to the area of the outer surface 21 of the processing structure 20 is not particularly restricted as long as it is in a range where the retention material 10 plays a desired role in the gas processing device 1, it may be 40% or more, for example.

The gas processing device 1 comprises the processing structure 20, the casing 30 for accommodating the processing structure 20 and the above-mentioned retention material 10 that is provided between the processing structure 20 and the casing 30.

As mentioned above, this retention material 10 can keep high retention power after repeated compression. Therefore, in the gas processing device 1 that is provided with this retention material 10, in a long-term use that involves heating and cooling, the retention power of the retention material 10 can be effectively kept.

Further, when the weight of the retention material 10 is decreased by reducing the width of the retention material 10 (the length in the gas processing direction of the gas processing device 1) as mentioned above, the ratio of the area of a part of the outer surface 21 that is covered by the retention material 10 relative to the area of the outer surface 21 of the processing structure 20 may be 80% or less, 70% or less or 60% or less. The ratio of the area of a part of the outer surface 21 that is covered by the retention material 10 relative to the area of the outer surface 21 of the processing structure 20 may be 40% or more, for example.

The gas processing device 1 can be produced by a method that comprises arranging the above-mentioned retention material 10 between the processing structure 20 and the casing 30. That is, when the casing 30 is an integral casing that cannot be divided, for example, at first, the retention material 10 is wound around the outer surface 21 of the retention structure 20, and then, the processing structure 20 that is covered by the retention material 10 is inserted into the casing 30, whereby the gas processing device 1 is assembled (the so-called stuffing method)

When the casing 30 is dividable, for example, at first, the retention material 10 is wound around the outer surface 21 of the processing structure 20, the processing structure 20 covered by the retention material 10 is disposed between a part and the other part of the casing 30, and thereafter, the part and the other part of the casing 30 are integrated (the so-called clamshell method). This integration is conducted by means of a clamping member such as a bolt and a nut and/or by welding, for example.

As shown in FIG. 1 and FIG. 2, in the gas processing device 1, the inner surface 11 of the retention material 10 is in contact with the outer surface 21 of the processing structure 20, and the outer surface 12 of the retention material 10 is in contact with the inner surface 31 of the casing 30. In the gas processing device 1, the retention material 10 is provided between the processing structure 20 and the casing 30 in a compressed state as compared with the retention material 10 before it is arranged between the processing structure 20 and the casing 30.

EXAMPLES

Next, the specific examples according to this embodiment will be explained.

Example 1

A retention material 10 made of inorganic fibers was produced by a wet method (dehydration molding method). That is, 100 parts by mass of inorganic fibers and 3 parts by mass of an organic binder (acrylic resin) were dispersed in water, whereby an aqueous slurry was prepared.

These inorganic fibers are alumina fibers comprising 73.0 wt % of $Al_2O_3$ and 27.0 wt % of $SiO_2$, and the measured value of the true density was 3.06 g/cm$^3$. The measured value of the true density was 87.9% of the theoretical value (3.48 g/cm$^3$).

Subsequently, the aqueous slurry was flown into a mold for dehydration molding provided with a wire mesh, followed by dehydration molding, whereby a wet molded product was obtained. Further, while compressing the entire wet molded product such that the thickness thereof becomes uniform, drying was conducted at 105° C. to obtain a molded product.

The molded product was processed into a disk-like shape, and fired by heating at 700° C. for 1 hour, whereby an inorganic fiber mat having a disk-like shape with a diameter of 50.8 mm and a thickness of 10.0 mm and having a bulk density of 0.15 g/cm$^3$ was obtained as the retention material of Example 1.

Example 2

A retention material was produced in the same manner as in Example 1, except that, as the inorganic fibers, inorganic fibers comprising 73.0 wt % of $Al_2O_3$ and 27.0 wt % of $SiO_2$ and a measured value of true density of 3.03 g/cm$^3$ were used. These inorganic fibers had a measured value of true density that was 87.1% of the theoretical value (3.48 g/cm$^3$).

Comparative Example 1

A retention material was produced in the same manner as in Example 1, except that, as the inorganic fibers, inorganic fibers comprising 96.0 wt % of $Al_2O_3$ and 4.0 wt % of $SiO_2$ and a measured value of true density of 3.23 g/cm$^3$ were used. These inorganic fibers had a measured value of true density that was 83.2% of the theoretical value (3.88 g/cm$^3$).

Comparative Example 2

A retention material was produced in the same manner as in Example 1, except that, as the inorganic fibers, inorganic fibers comprising 80.0 wt % of $Al_2O_3$ and 20.0 wt % of $SiO_2$ and a measured value of true density of 3.07 g/cm$^3$ were used. These inorganic fibers had a measured value of true density that was 85.3% of the theoretical value (3.60 g/cm$^3$).

Evaluation Example 1

[Measurement of Surface Pressure after Repeating Compression]

Figure 4:
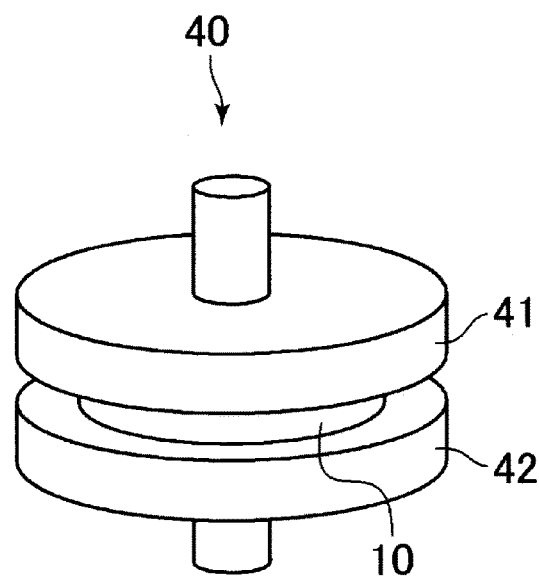
FIG. 4 is an explanatory view showing a testing apparatus used in the examples according to one embodiment of the invention.

By using the testing apparatus 40 shown in FIG. 4, a repeating compression test of the retention material was conducted, thereby to measure the surface pressure of the retention material. The testing apparatus 40 was provided with a first jig 41 (a member corresponding to a processing structure such as a catalyst support) that is a circular plate (diameter: 100 mm, thickness: 30 mm) made of Inconel (registered trade mark) and a second jig 42 (a member corresponding to a casing) that is provided such that it opposites to the first jig 41 that is a circular plate (diameter: 100 mm, thickness: 30 mm).

In this testing apparatus 40, the retention material produced as above was disposed between the first jig 41 and the second jig 42 such that the distance between the first jig 41 and the second jig 42 (that is, the thickness of the retention material being sandwiched between the first jig 41 and the second jig 42) became 10 mm.

In the state where the retention material is sandwiched between the first jig 41 and the second jig, by reducing and increasing the distance between the first jig 41 and the second jig 42 repeatedly, a test was started in which the retention material was compressed and released repeatedly.

That is, at first, by reducing the distance between the first jig 41 and the second jig 42 at a speed of 10 mm/min, the retention material was compressed at said speed of 10 mm/min such that the bulk density thereof became a prescribed compression bulk density (0.30 g/cm$^3$, 0.40 g/cm$^3$ or 0.50 g/cm$^3$). Subsequently, the retention material was retained for 10 seconds in the compressed state (the state in which the bulk density of the retention material was kept at the compression bulk density).

Thereafter, by increasing the distance between the first jig 41 and the second jig 42 at a speed of 10 mm/min, the retention material was released at the speed of 10 mm/min until the bulk density of the retention material became a release bulk density that was smaller than the above-mentioned compression bulk density by 12% (release bulk densities of 0.27 g/cm$^3$, 0.36 g/cm$^3$ and 0.44 g/cm$^3$ that correspond to the above-mentioned compression bulk densities of 0.30 g/cm$^3$, 0.40 g/cm$^3$ and 0.50 g/cm$^3$, respectively). Further, this cycle of compression and releasing was repeated 2500 times.

A release surface pressure after repeating the cycle 2500 times was measured. That is, at the time where the 2500 cycles were completed, the force of repulsion per unit surface area that was applied to the first jig 41 from the release retention material sandwiched between the first jig 41 and the second jig (the retention material of which the bulk density is a release bulk density) was measured as the release surface pressure (N/cm$^2$) after repeating compression 2500 times.

Figure 5:
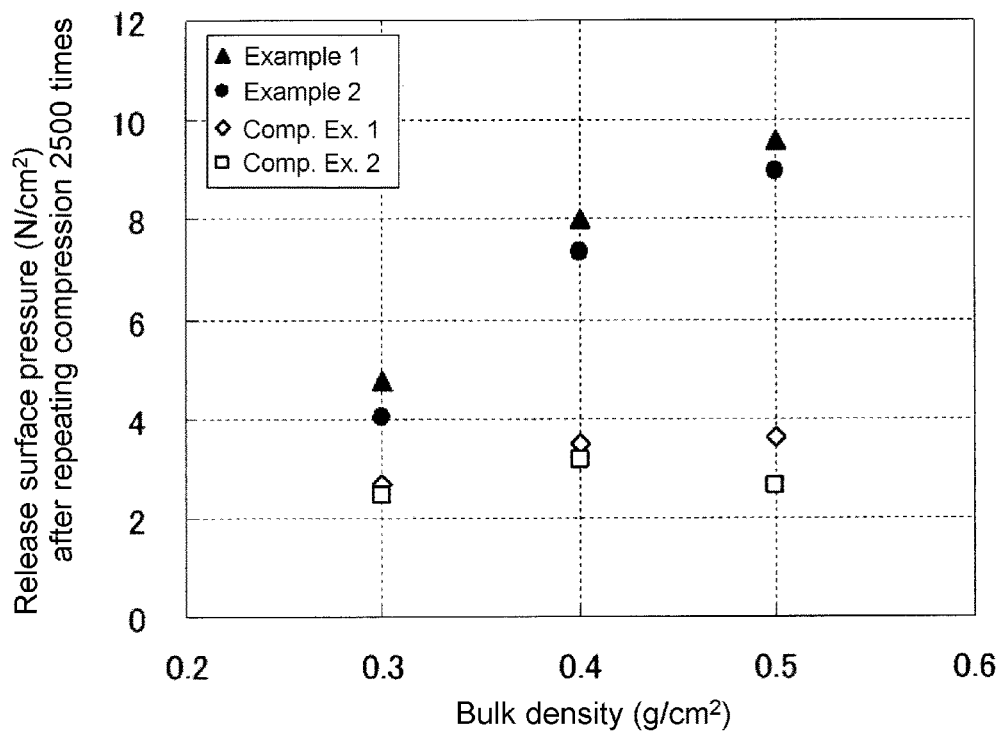
FIG. 5 is an explanatory view showing one example of the results of a measurement of a release surface pressure of a retention material in the examples according to one embodiment of the invention.

FIG. 5 shows the results of the measurement of the surface pressure after the repeating compression. In FIG. 5, the horizontal axis shows the bulk density (g/cm$^3$) of the retention material in the compressed state and the vertical axis shows the release surface pressure (N/cm$^2$) after repeating compression 2500 times.

In FIG. 5, the black triangles show the results of the retention material according to Example 1, the black circles show the results of the retention material according to Example 2, the white diamonds show the results of the retention material according to Comparative Example 1 and the while squares shown the results of the retention material according to Comparative Example 2.

As shown in FIG. 5, in any of the compression bulk densities of 0.30 g/cm$^3$, 0.40 g/cm$^3$ and 0.50 g/cm$^3$, the release surface pressure of the retention materials according to Examples 1 and 2 was significantly larger than those of the retention materials according to Comparative Examples 1 and 2.

When the three black triangles shown in FIG. 5 are linearly approximated, the resulting approximated straight line was expressed as follows when the compression bulk density is expressed as D (g/cm$^3$) and the release surface pressure after repeating compression 2500 times is expressed as P (N/cm$^2$): P=24.42×D−2.31 (R$^2$=9.62). As mentioned above, this approximated straight line is consistent with the broken line L0 shown in FIG. 3. The release surface pressure measured in Comparative Examples 1 and 2 are plotted in FIG. 3 below the solid line L1 (P=17.10× D−1.62).

Evaluation Example 2

[Measurement of Initial Surface Pressure]

In the same manner as in the case of the surface pressure after the repeated compression as mentioned above, by using the testing apparatus 40 shown in FIG. 4, the initial surface pressure of the retention material was measured. That is, at first, the retention material produced as mentioned above was sandwiched between the first jig 41 and the second jig 42 of the testing apparatus 40.

Subsequently, in the state where the retention material was sandwiched between the first jig 41 and the second jig 42, by reducing the distance between the first jig 41 and the second jig 42 at a speed of 10 mm/min, the retention material was compressed until the bulk density thereof was increased from 0.25 g/cm$^3$ to 0.50 g/cm$^3$.

During the process of compression, when the bulk density of the retention material became a prescribed compression bulk density, the force of repulsion per unit surface area that was applied to the first jig 41 from the retention material at that time was measured as an initial surface pressure (N/cm$^2$) relative to the compression bulk density.

Figure 6:
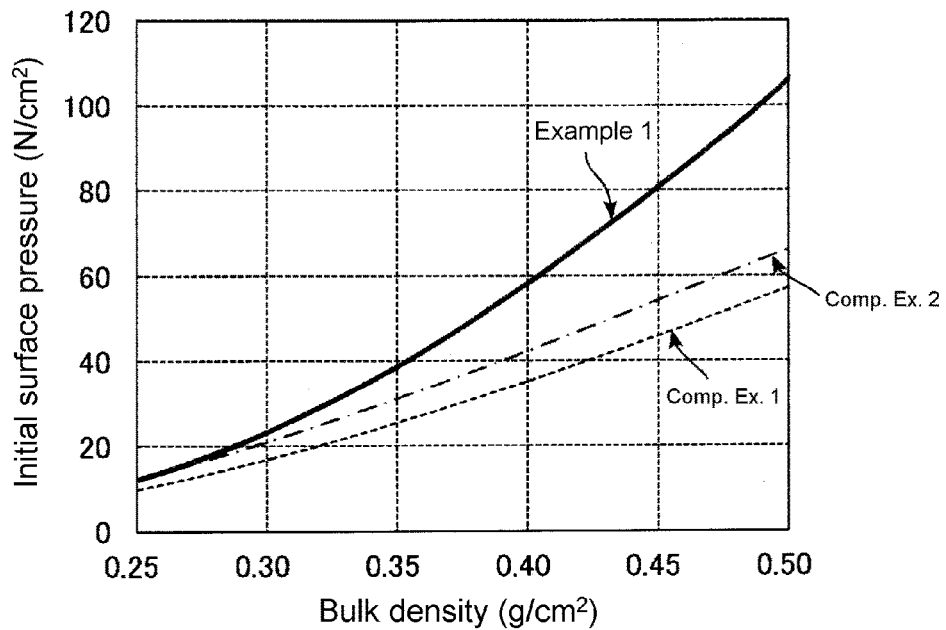
FIG. 6 is an explanatory view showing one example of the results of a measurement of an initial surface pressure of a retention material in the examples according to one embodiment of the invention.

FIG. 6 shows the results of measurement of the initial surface pressure. In FIG. 6, the horizontal axis indicates the bulk density (g/cm$^3$) of the retention material and the vertical axis indicates the initial surface pressure (N/cm$^2$).

In FIG. 6, the solid line indicates the results of the retention material according to Example 1, the broken line indicates the results of the retention material according to Comparative Example 1 and the dashed line indicates the results of the retention material according to Comparative Example 2.

As shown in FIG. 6, in a broad range of bulk density (in particular, in a bulk density range of 0.30 g/cm$^3$ or more and 0.50 g/cm$^3$ or less), the initial surface pressure of the retention material according to Example 1 was significantly larger than those according to Comparative Examples 1 and 2.

That is, the initial surface pressure of the retention material according to Comparative Example 2 when the bulk densities of the retention material were 0.30 g/cm$^3$, 0.35 g/cm$^3$, 0.40 g/cm$^3$, 0.45 g/cm$^3$ and 0.50 g/cm$^3$ are respectively 20 N/cm$^2$, 31 N/cm$^2$, 42 N/cm$^2$, 54 N/cm$^2$ and 66 N/cm$^2$.

On the other hand, the initial surface pressure of the retention material according to Example 1 when the bulk densities of the retention material were 0.30 g/cm$^3$, 0.35 g/cm$^3$, 0.40 g/cm$^3$, 0.45 g/cm$^3$ and 0.50 g/cm$^3$ were 23 N/cm$^2$, 39 N/cm$^2$, 58 N/cm$^2$, 81 N/cm$^2$ and 106 N/cm$^2$, respectively.

Evaluation Example 3

[Measurement of Wet Volume]

The wet volume of the retention material was measured. That is, at first, parts of the retention material (2 g in Examples 1 and 2, and 5 g in Comparative Examples 1 and 2) were taken as samples. By stirring the samples in tap water in a 500 mL-container, the inorganic fibers constituting the sample were dispersed.

Subsequently, a solution containing the dispersed inorganic fibers was transferred to a 1000 mL-graduated cylinder. While the inorganic fibers were dispersed by stirring, tap water was added such that the volume of the solution became 1000 mL.

By allowing the graduated cylinder to stand for 30 minutes or more, the inorganic fibers were allowed to settle in the 1000 mL of the solution. The scale (mL) of the graduated cylinder corresponding to the upper end surface of the settled inorganic fiber agglomerate was read. Then, the volume (mL) corresponding to the scale was obtained as a wet volume per 5 g (mL/5 g) of the retention material. As for Examples 1 and 2, when the sample weighing 5 g was used, the volume of the solution exceeded 1000 mL, and hence, a value obtained by using 2 g of the sample was converted into a value per 5 g of the sample, whereby the wet volume (mL/5 g) was calculated.

As a result, the wet volume of the retention material according to Example 1 was 1500 mL/5 g and the wet volume of the retention material according to Example 2 was 1500 mL/5 g. On the other hand, the wet volume of the retention material according to Comparative Example 1 was 700 mL/5 g and the wet volume of the retention material according to Comparative Example 2 was 600 mL/5 g.

INDUSTRIAL APPLICABILITY

The retention material for a gas processing device of the invention can be used in a catalyst converter of an automobile or the like.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in this specification and the Japanese application specification claiming priority under the Paris Convention are incorporated herein by reference in its entirety.

The invention claimed is:

1. A retention material for a gas processing device comprising a processing structure and a casing for accommodating the processing structure,
   the retention material being to be arranged between the processing structure and the casing,
   wherein
   the retention material comprises inorganic fibers and no inorganic intumescent materials,
   the inorganic fibers are alumina fibers comprising 70 wt % to 75 wt % of alumina and 30 wt % to 25 wt % of silica, and
   in a test of repeating a cycle of compressing the retention material until a bulk density of the retention material becomes a prescribed compression bulk density, followed by retaining for 10 seconds, and then releasing until a bulk density of the retention material becomes a release bulk density that is smaller by 12% than said prescribed compression bulk density; a release surface pressure of the retention material after repeating the cycle 2500 times and the compression bulk density of the retention material satisfies the following relationship:

$$P \geq 17.10 \times D - 1.62$$

wherein P is the release surface pressure (N/cm$^2$) and D is the compression bulk density (g/cm$^3$).

2. The retention material for a gas processing device according to claim 1 wherein a true density measured of the inorganic fibers is 3.02 g/cm$^3$ to 3.50 g/cm$^3$.

3. The retention material for a gas processing device according to claim 1, wherein a ratio of a measured value of a true density of the inorganic fibers to a theoretical value of the true density of the inorganic fibers is 86.9% or more.

4. The retention material for a gas processing device according to claim 1, wherein the retention material is a retention material produced by a wet method or by a dry method.

5. The retention material for a gas processing device according to claim 1, wherein a wet volume of the retention material is 750 mL/5 g or more.

6. A gas processing device, comprising:
   a processing structure;
   a casing for accommodating the processing structure; and
   the retention material according to claim 1 that is arranged between the processing structure and the casing.

7. A method for producing a gas processing device comprising:
   a processing structure;
   a casing for accommodating the processing structure; and
   the retention material according to claim 1 that is arranged between the processing structure and the casing,
   the method comprising arranging the retention material between the processing structure and the casing.

* * * * *